(12) United States Patent
Hufenbach et al.

(10) Patent No.: US 12,378,011 B2
(45) Date of Patent: Aug. 5, 2025

(54) TRANSPORT UNIT FOR AN AIRCRAFT, AND AIRCRAFT

(71) Applicant: GERMANIUM SKIES GMBH, Dresden (DE)

(72) Inventors: Werner Hufenbach, Dresden (DE); Jens Werner, Coswig (DE)

(73) Assignee: GERMANIUMTECH GMBH, Dresden (DE)

( * ) Notice: Subject to any disclaimer, the term of this patent is extended or adjusted under 35 U.S.C. 154(b) by 136 days.

(21) Appl. No.: 18/273,072

(22) PCT Filed: Jan. 12, 2022

(86) PCT No.: PCT/DE2022/100020
§ 371 (c)(1),
(2) Date: Jul. 19, 2023

(87) PCT Pub. No.: WO2022/156855
PCT Pub. Date: Jul. 28, 2022

(65) Prior Publication Data
US 2024/0002043 A1    Jan. 4, 2024

(30) Foreign Application Priority Data

Jan. 20, 2021  (DE) .......................... 102021101115.9
Jan. 20, 2021  (DE) .......................... 102021101116.7

(51) Int. Cl.
*B64U 10/13*    (2023.01)
*B64C 3/38*    (2006.01)
(Continued)

(52) U.S. Cl.
CPC .............. *B64U 10/13* (2023.01); *B64C 3/385* (2013.01); *B64C 27/22* (2013.01); *B64D 1/22* (2013.01);
(Continued)

(58) Field of Classification Search
CPC .............................. B64D 1/22; B64U 2101/60
See application file for complete search history.

(56) References Cited

U.S. PATENT DOCUMENTS 3,090,581 A  *  5/1963  Einarsson ............... B64C 37/00
                                                        244/48
3,474,987 A     10/1969  Meditz
(Continued)

FOREIGN PATENT DOCUMENTS

CN         105857610 A  *  8/2016
ES           1172708 U  * 12/2016
(Continued)

*Primary Examiner* — Magdalena Topolski
(74) *Attorney, Agent, or Firm* — Abel Schillinger, LLP

(57) ABSTRACT

The invention relates to a transport unit (1) for a vertical take-off and landing aircraft (100) for transporting people and/or loads. The transport unit (1) comprises a transport facility (2), at least one fastening element (3), configured for fastening the transport unit (1) to a flight unit (10) of the aircraft (100), and a positioning device (4). The positioning device (4) is configured for changing and fixing an inclined position of the transport facility (2) with respect to the at least one fastening element (3). In addition, a vertical take-off and landing aircraft for transporting people and/or loads, having a flight unit (10) and a transport unit (1) fastened to the flight unit (10), and a control unit (16) for controlling such an aircraft (100) are specified.

20 Claims, 9 Drawing Sheets

(51) Int. Cl.
  *B64C 27/20* (2023.01)
  *B64C 27/22* (2006.01)
  *B64D 1/22* (2006.01)
  *B64U 30/12* (2023.01)
  *B64U 101/61* (2023.01)

(52) U.S. Cl.
  CPC .............. *B64U 30/12* (2023.01); *B64C 27/20* (2013.01); *B64U 2101/61* (2023.01)

(56) References Cited

U.S. PATENT DOCUMENTS

| | | | |
|---|---|---|---|
| 4,537,372 A * | 8/1985 | Forizs ................. | B64C 29/0033 244/66 |
| 6,845,939 B1 | 1/2005 | Baldwin | |
| 9,254,916 B2 * | 2/2016 | Yang ....................... | B64C 3/546 |
| 10,137,047 B1 * | 11/2018 | DiFrancesco ............ | G08G 5/34 |
| 10,207,805 B2 * | 2/2019 | Evans ..................... | B64D 1/22 |
| 10,308,358 B2 * | 6/2019 | Phan ....................... | B64U 50/34 |
| 10,358,217 B2 * | 7/2019 | Sekiya ................. | B64D 11/062 |
| 10,745,129 B2 * | 8/2020 | Near .................... | B64U 30/293 |
| 11,111,010 B2 * | 9/2021 | Bernard ................. | B64C 27/26 |
| 11,485,490 B2 * | 11/2022 | Petrov .................... | B64C 3/187 |
| 2002/0100834 A1 | 8/2002 | Baldwin | |
| 2017/0341725 A1 | 11/2017 | Skahan | |
| 2018/0002013 A1 | 1/2018 | McCullough et al. | |
| 2018/0093765 A1 * | 4/2018 | Graham ................. | B64C 39/08 |
| 2020/0317332 A1 | 10/2020 | Didey | |

FOREIGN PATENT DOCUMENTS

| | | | |
|---|---|---|---|
| KR | 20230105806 A * | 7/2023 | |
| WO | 2019122926 A1 | 6/2019 | |
| WO | 2020035900 A1 | 2/2020 | |

\* cited by examiner

TRANSPORT UNIT FOR AN AIRCRAFT, AND AIRCRAFT

BACKGROUND OF THE INVENTION

1. Field of the Invention

This invention relates to a transport unit for a vertical take-off and landing aircraft for transporting people and/or loads, a vertical take-off and landing aircraft for transporting people and/or loads as well as a control unit for controlling such an aircraft.

2. Discussion of Background Information

Aircraft for transporting persons and/or loads are becoming increasingly important because they enable rapid transportation largely independently of infrastructure facilities such as roads, railways, bridges, tunnels, etc. This is particularly true for smaller aircraft that can take off and land vertically and therefore do not require a runway.

Aircraft of this kind usually have a flight unit, which serves to propel the aircraft, and a transport unit connected to the flight unit in which people and/or loads can be accommodated. In various flight situations, the aircraft may be inclined relative to the ground. The resultant tilting movement of the transport unit can be unpleasant for the persons being transported because their position changes together with the position of the aircraft. The same applies to loads being transported since these can slip and get damaged due to the tilting movement. In addition, the tilting movement affects the aircraft's centre of gravity, so that flight safety can be impaired.

Against this background, it is the object of the invention to indicate possibilities by which the aforementioned negative effects can be reduced or even completely eliminated when the aircraft is inclined.

SUMMARY OF THE INVENTION

A first aspect of the invention relates to a transport unit for a vertical take-off and landing aircraft for transporting people and/or loads. The transport unit comprises a transport facility, at least one fastening element and a positioning unit. The fastening element is designed for fastening the transport unit to a flight unit of the aircraft. The positioning unit is used for changing and securing an inclined position for the transport facility in relation to at least one fastening element.

In particular, the aircraft can be what is known as a VTOL aircraft (Vertical Take-Off and Landing). The aircraft features a flight unit that serves to propel the aircraft. For this purpose, the flight unit can have drive units, e.g., preferably in the form of several rotors. The flight unit can have a wing assembly extending into at least one wing assembly plane on which the drive units can be arranged.

By way of example, the transport facility can be arranged as a transport capsule or may be enclosed by a transport capsule. The transport capsule therefore serves to enclose the people and/or loads to be transported.

A transport capsule can preferably have an aerodynamically favourable shape, e.g., spherical or primarily droplet-shaped so that, while in flight mode, the static air resistance of the transport capsule as well as the effect on airflow around the transport capsule caused by operation of the rotors on the flight unit (dynamic air resistance) can be reduced further. Therefore, the droplet-shaped transport capsule can preferably be extended primarily at a perpendicular angle to the wing assembly plane.

The transport capsule can terminate in a longitudinally extended shaft. The width of the ball or droplet shape can be reduced, e.g., at a transverse angle to the main direction of flight of the aircraft to generate the lowest possible air resistance when flying long distances. Consequently, an ellipsoid shape can be selected instead of a ball shape.

The transport capsule may include opaque and transparent surfaces. To load and unload the transport capsule and/or to enable the people being transported to board and leave the aircraft, the transport capsule can have one or several, e.g., two, doors and/or flap panels. Preferably, two doors can be arranged opposite each other, designed for folding or sliding to enable quick, safe and user-friendly entry and exit or loading and unloading.

The transport capsule can also be designed to be tightly sealed. This enables fast and cost-effective air conditioning of the interior of the transport capsule and protects the people or loads to be transported from environmental effects and air flow in flight.

If the transport capsule is intended for the transport of people, it can feature seats and safety equipment such as seat belts and/or airbags. The transport capsule can also feature air-conditioning equipment, e.g., heating and lighting facilities to enhance comfort.

The fastening element is used to secure the transport unit to the flight unit wherein the fastening element can be designed as a releasable fastening element, e.g., as a screw connection, coupling connection etc., or as a non-releasable fastening element, e.g., as a welded connection. The fastening element defines a fastening point or a fastening area that are adjacent to one another when fastened, linking the transport unit and the flight unit together.

The transport unit also has a positioning unit with which an inclined position of the transport facility can be changed and secured in relation to the fastening element. For this, the positioning unit itself can be arranged at a fixed angle, e.g., fixed in location, to be arranged with respect to the fastening element. The functions of the fastening element and the positioning unit can also be integrated together in a combined fastening and positioning unit.

The term "inclined position" primarily denotes a rotational position that can accommodate the transport facility in relation to the fastening element. The inclined position is characterised by an angle of inclination between the transport facility and the fastening element. This involves the angle of inclination being enclosed between a linear axis bisecting the transport facility and another linear axis bisecting the fastening element. The angle of inclination can also be referred to as an angle of rotation.

Changing and fixing an inclined position means that a transition from a first inclined position with a first angle of inclination to a second and possibly further inclined position with an angle of inclination different from the first angle of inclination can take place and the transport facility can be fixed, e.g., secured, in the selected inclined position. This change in inclined position can be infinitely variable or can be achieved in steps that can be specified individually.

The change in inclined position can occur in a spatial direction, i.e., around an axis of rotation, e.g., forwards and backwards. Optionally, a change in the inclined position in one or more further spatial directions can be facilitated which makes it possible to arrange the axes of rotation for each of the tilt movements perpendicular to one another.

For example, the inclined position can be changed and secured in such a way that a central axis on the transport facility always runs along the gravitational field line of a gravitational field that is exerting an influence on the transport unit.

In this process, the central axis can be viewed as a reference line that passes straight through the transport facility or transport capsule, preferably through an axis of rotation around which a rotational movement can be performed to change the inclined position. Facilities in the transport facility, e.g., seats for the transport of people and/or compartments for the transport of loads can be arranged in relation to the central axis in a manner that makes their transport a comfortable process.

In other words, the change to the inclined position can occur in relation to the gravitational field acting on the transport unit in a way that prevents any significant changes to the position of the transport facility relative to that gravitational field despite changes in the position of the fastening element.

This ability to change the inclined position of the transport facility in relation to the fastening element makes it possible to vary the inclined position between the transport facility and the flight unit when the transport unit is attached to the flight unit. This opens up the possibility of compensating for an inclination of the aircraft relative to the surface of the ground, e.g., on an en-route flight, from the perspective of the transport facility. This can for example ensure that people or loads being transported can be seated or arranged in an upright position, respectively.

This can, among other things, help to improve safety during operation of the aircraft and the transport of persons and/or loads because this prevents the transported goods from slipping, or ensures that any slippage is only minimal. This makes it possible to simplify the securing of loads and/or of passenger seating, thereby reducing the associated cost incurred. The flight can be made more pleasant for the people being transported because the subjectively experienced seat position does not change, or only changes slightly. This can help to increase the acceptance of vertical take-off and landing aircraft.

As an option, the transport unit can be equipped with a stand arrangement designed to support the transport unit safely on a supporting surface, e.g., the ground. Preferably, this stand arrangement would be arranged on the transport facility with the ability to be folded in or out. This means that, during a flight, it would be folded in close to the transport unit to improve the aerodynamic behaviour of the aircraft. This stand arrangement can, for example, be made of metal, plastic or a fibre composite material.

In accordance with various embodiment variants, the positioning unit can have a curved sliding unit. The curved sliding unit can, for example, be arranged as a rotary rail.

The curved sliding unit can enclose the transport facility and/or the transport capsule entirely or partially which means that the transport facility and/or transport capsule can be mounted in the curved sliding unit with the ability to rotate. Preferably, the curved sliding unit can interact with the transport capsule, in the majority of cases arranged in the shape of a sphere or an ellipsoid.

To change the inclined position of the transport facility, the transport facility can be moved using the curved sliding fixture. For this, gears can be provided for guidance. To secure the inclined position, a securing unit can be provided, e.g., in the shape of a securing bolt.

The curved sliding unit is an advantageous way of changing and securing the inclined position of the transport facility reliably in relation to the fastening element.

In accordance with various embodiment variants, the transport unit can have a longitudinally extended shaft one end of which connects to the fastening element and the other end of which connects to the positioning unit.

The shaft provides the intended connection between transport facility and fastening element as well as the connection between fastening element and the flight unit.

For example, the shaft can be designed as a straight rod with, for example, a rectangular cross-section with edges rounded over the circumference of the rod or with a round or oval rod cross-section.

The shaft can preferably be designed to be essentially rotationally symmetrical, e.g., in the form of a straight circular cylinder, wherein the longitudinal extension of the cylinder corresponds to the length of the shaft and the base surface and top surface of the cylinder, also as a narrow side.

Preferably the shaft can be as thin as possible, e.g., it can have a narrow diameter. A thin and rotationally symmetrical embodiment of the shaft significantly reduces the mass and the air resistance of the shaft and therefore also of the transport unit.

Preferably, the connection between positioning unit and shaft can be rigid. For example, the positioning unit and shaft can be connected to each other by a material bond, e.g. welded.

By forming a longitudinally extended shaft and fastening the positioning unit with transport facility to this shaft, it is advantageous to maintain a certain distance between the transport facility and fastening element. This can significantly increase operational safety by effectively preventing undesired contact between an active person and/or load to be transported and the flight unit secured to the transport unit. In addition, maintaining a defined distance like this helps to reduce the noise level for the people being transported.

Furthermore, by arranging the transport facility at a slight distance from the flight unit, the transport facility can be located outside the downwash range of the flight unit's propellers which can lead to a reduction in drag and to an improvement in aerodynamics.

In accordance with other embodiment variants, at least one fastening element can be part of a coupling device configured as a detachable fastener that connects the transport unit to the flight unit.

Here, the fastening element constitutes a first part of the coupling connection belonging to the transport unit. The corresponding second part of this coupling device to the first part of the coupling device is arranged on the flight unit as a mating part. The coupling device may be designed as an articulated coupling device.

The coupling device facilitates a modular design for the aircraft in which the flight units and transport units can be combined with each other as desired by means of the coupling device and can be connected and disconnected repeatedly.

Preferably, the coupling device can be designed as an autonomous, i.e., automatic, coupling device. This makes it possible to couple the flight unit to the transport unit automatically. The coupling process can be performed quickly and safely because no manual coupling operation is involved.

The coupling device can be designed as a controllable unit to enable the coupling process to be performed by remote control. In addition, coupling or uncoupling may be performed subject to various conditions. For example, uncoupling may only be possible if the transport unit is in contact with the ground. This can help to increase safety.

The modular layout makes a flexible combination of transport and flight units possible. In other words, different kinds of transport and/or flight units can be interchanged.

For example, a first transport unit can be designed to transport people while a second transport unit may be designed to transport loads. In the same manner, different flight units can be coupled to the same flight units on the same transport unit. For example, the number and/or arrangement of transport units can differ from those of the drive units. For example, depending on the load to be transported and/or the flight conditions (wind strength and direction, altitude, etc.), flight units with more or fewer drive units can be selected.

Another aspect of this invention relates to a vertical take-off and landing aircraft for transporting people and/or loads. The aircraft has a flight unit and a transport unit mounted on the flight unit in accordance with the preceding description.

The advantages mentioned above in relation to the transport unit are also associated in a corresponding manner with the aircraft. The transport unit can be permanently attached to the flight unit, e.g., by means of a welded bond. Alternatively, the transport unit may be detachably attached to the flight unit. For example, transport unit and flight unit can be connected together by a coupling device, as described above, so that the aircraft has a modular design.

As already mentioned, the flight unit can have a wing assembly extending into at least one wing assembly plane on which the drive units can be arranged.

The wing assembly can comprise radially, axially and tangentially arranged, preferably straight or curved wing assembly struts, which for example may be connected together at node points using the connecting pieces assigned to the wing assembly, e.g., T-pieces, and if necessary to a central unit arranged centrally in the wing assembly.

The interconnected wing assembly struts can form a self-contained wing assembly, i.e. without any free-ended wing assembly struts, which is therefore particularly rigid.

For example, the wing assembly struts can be arranged in such a way that a flat, hexagonally braced wing assembly is formed in the same plane as the wing assembly. For this purpose, six radially evenly spaced wing assembly struts can be arranged so that two adjacent radially arranged wing assembly struts form an angle of approximately 60°. For example, the flight module in the hexagonal embodiment of the wing assembly can have a total of 18 drive units.

As well as the drive units, one or more air deflectors can be arranged on the wing assembly. Alternatively or in addition, air deflectors can also be arranged on the transport unit. The air deflectors can be wing-shaped, for example panel-shaped or slightly curved, and can be mounted on the wing assembly in an angle-adjustable manner using a bearing axis on the air deflector.

In a wing-shaped embodiment, the air deflectors can have a leading edge and a trailing edge wherein the leading edge is in front of the trailing edge when viewed in the direction of flight while in en-route flight mode. In this position, the suction side is at the top and the pressure side is at the bottom. The wing-shaped air deflectors can have wing sections on both sides of the bearing axis wherein one wing section that primarily points in the direction of flight during en-route flight mode, defined as the leading wing and a wing section extending in the opposite direction, defined as the trailing wing, behind the leading wing viewed in the direction of flight during en-route flight mode and which for the most part faces in the opposing direction to the direction of flight.

The transport unit is attached to the flight unit using the fastening element on the transport unit. Optionally, the fastening element can be able to slide along the wing assembly, i.e., primarily on the wing assembly plane or parallel to the wing assembly plane. This can for example be achieved by positioning the transport unit in relation to the flight unit in a way that enables the aerodynamics of the aircraft to be improved, e.g., by positioning the transport unit is positioned in the airflow shadow of the flight unit. In addition, a better view for persons being transported can be achieved if the transport unit is positioned in relation to the flight unit is such that a viewing area is not or is only slightly obscured by the wing assembly.

To change the inclined position of the transport facility in relation to the fastening element, a central axis of the transport facility can be positioned using the positioning unit across a range that extends between a surface normal of the wing assembly plane and a parallel of the wing assembly plane. This area can extend to a partial area between the surface normal and the parallel or it can be directly bounded by the surface normal and its parallels.

In other words, the transport facility can be inclined up to 90° with respect to the wing assembly plane. When the flight unit is oriented vertically with respect to the Earth's surface or when the wing assembly plane is oriented substantially like the Earth's gravitational field, this can facilitate a substantially parallel orientation of the transport facility with respect to the Earth's surface.

In accordance with various embodiment variants, the transport facility can be arranged in the wing assembly plane. For example, the transport facility may be arranged centrally with respect to the wing assembly plane in a way that enables the transport facility to extend substantially on both sides of the wing assembly plane.

An arrangement of the transport facility of this kind is independent of the presence of the positioning unit described above and of the scope for changing and fixing an inclined position of the transport facility in relation to the fastening element.

Consequently, another aspect of this invention relates to a vertical take-off and landing aircraft for transporting people and/or loads, having a flight unit with a wing assembly extending into at least one wing assembly plane and having a transport unit attached to the flight unit with a transport facility, wherein at least one wing assembly plane is arranged in that transport facility.

Through the arrangement of the transport facility in the wing assembly plane, the centre of gravity of the aircraft can be positioned centrally, e.g., in the wing assembly plane. This can improve flight characteristics in comparison to a position of the centre of gravity located at a distance from the wing assembly plane. The gravity of the transport facility than acts in the same plane as the lift force of the wings, without causing torques to arise around the axis of the center of gravity that the propellers would otherwise need to compensate for.

In accordance with various embodiments, the aircraft can have a central unit which can preferably be arranged centrally to a centre axis of the aircraft. The central unit may for example feature a housing, e.g., in the shape of a hemisphere or an ellipsoid. For example, the central unit can consist of two halves that are joined, e.g., bolted together. Openings may be provided for maintenance and for carrying out small repairs. The central unit may also be designed to support struts of the wing assembly, e.g., where one end of the wing assembly struts is attached to the central unit and they extend radially outwards from the central unit.

The central unit may be designed for example for the storage or arrangement of objects, such as auxiliary equipment or technical functional units. By way of example, the central unit may have a rescue system, e.g., a parachute to shoot out, in the uppermost part of the central unit.

The central unit may have technical functional units, such as control, positioning and/or communication technology and/or a charging module.

The housing of the central unit may have one or more cavities for storing or arranging the auxiliary equipment and/or technical functional units. The auxiliary equipment or technical functional units may be arranged in the cavities and/or on the housing, for example on the top or side in the free space between the radial wing assembly struts.

The integrated positioning technology can for example use positioning signals e.g., from a global satellite navigation system such as GPS, Galileo, GLONASS, Beidou, etc. to determine the location of the aircraft and to determine and control the flight route and destination of the aircraft.

The integrated communication technology can be designed for internal and/or external communication, where internal communication means communication with modules on the aircraft that are intended directly for use with the aircraft, for example communication between the flight module and transport module or flight module and ground control station.

External communication means for example communication regarding flight permission, flight route, location etc. for air traffic control or for exchanging information with meteorological services.

In addition, the central unit may also have software and/or hardware for carrying out a landing approach to a take-off and landing station.

The positioning of auxiliary equipment and technical functional elements in or on the centrally arranged central unit can enable a centre of gravity position focused on the centre of the aircraft, making the aircraft easier to control.

The central unit facilitates a preferable and centralized arrangement and embodiment of control units and associated control functions as well as, when required, other assemblies on the aircraft.

Optionally, it can be possible to slide the central unit along the central axis of the transport facility or along a surface normal of at least one wing assembly plane, i.e. perpendicular to the wing assembly plane. For this, a sliding device can be arranged on the central unit. In other words, a sliding position for the central unit can be changed and secured.

For this, the central unit can enclose the central axis of the transport facility. A sliding arrangement of this kind is independent of the presence of the positioning unit described above and of the scope for changing and fixing an inclined position of the transport facility in relation to the fastening element.

Consequently, another aspect of this invention relates to a vertical take-off and landing aircraft for transporting people and/or loads, having a flight unit with a wing assembly extending into at least one wing assembly plane and having a transport unit attached to the flight unit with a transport facility and a central unit wherein the central unit is able to slide along a surface normal of at least one wing assembly plane. This ability of the central unit to slide makes it possible to relocate the centre of gravity of the aircraft. For example, the central unit is able to be slide and can be relocated to the opposite side of the wing assembly plane. By using the central unit as a counterweight to the transport unit, the centre of gravity of the aircraft can be relocated in the wing assembly plane. This can improve flight characteristics in comparison to a position of the centre of gravity located at a distance from the wing assembly plane.

In other words, a torque generated by positioning the transport unit outside the plane of the centre of gravity and acting on the aircraft can be partially or fully compensated for by generating a counter-torque through movement of the central unit, which has a not inconsiderable mass due to the presence of batteries etc., when the central unit is also moved to a position outside the plane of the centre of gravity.

It is possible to use the distance between the central unit and the centre of gravity plane, which can be approximately the same as the wing assembly plane, to compensate for the transport mass. If the transport mass is small, the central unit remains close to the wing assembly plane. If the transport mass is big, the central unit continues to be moved outwards, creating a bigger lever arm relative to the wing assembly plane and generating a higher level of counter-torque.

In accordance with further embodiment variants, the central unit can be integrated in the transport facility.

This is especially advantageous when the transport facility is arranged in the wing assembly plane because this creates a particularly compact aircraft with very good flight characteristics. In particular, main and/or auxiliary battery systems arranged in the central unit can be integrated in the transport facility. This can be an advantage when changing the transport facility because, together with the change of transport facility, it is possible at the same time to replace the batteries which in turn means that the transport facility is effectively able to bring along its own energy for the intended flight path.

Integration in the central unit of the transport facility is also independent of the presence of the positioning unit described above and of the scope for changing and fixing an inclined position of the transport facility in relation to the fastening element.

Another aspect of this invention relates to a control unit for controlling an aircraft in accordance with the preceding description. The control unit is set up and designed to generate and output control signals that cause a change in the inclined position of the transport facility with respect to the at least one fastening element and/or a change in a sliding position of the central unit depending on an inclined position of the flight unit.

The control unit can receive sensor signals from sensors, e.g., tilt sensors that establish the inclined position of the flight unit, and/or user input and, based on instructions or on code programmed into the control unit for one or more routines and can process the generation of control signals. These generated control signals are issued to actuators, e.g., on the positioning unit or a sliding device on the central unit. For this purpose, a signalling system connects the control unit to the actuators and, if applicable, also to the sensors. The control unit can be implemented in a hardware and/or a software form and may be embodied physically in one or more parts.

The term "inclined position" designates the positioning of the flight unit relative to the surface of the Earth. For example, depending on the flight phase of the aircraft, the inclined position can vary, for example by varying the rotor speed in an appropriate manner using the drive units distributed across the wing assembly. For example, the wing assembly plane of the aircraft may be oriented substantially perpendicular to the surface of the Earth in a take-off and landing phase, while the wing assembly plane may be oriented perpendicular to the surface of the Earth during an en-route flight phase. Transitions between take-off and the en-route flight phase and between the en-route flight phase to the landing phase can be marked by corresponding intermediate positions of the wing assembly plane and therefore of the inclined position of the flight unit.

By means of the control unit, an automated change of the inclined position of the transport facility and/or the sliding position of the central unit can be achieved depending on the inclined position of the flight unit.

BRIEF DESCRIPTION OF THE DRAWINGS

Further advantages of the present invention are evident from the illustrations and the associated description. They show:

Figure 1:
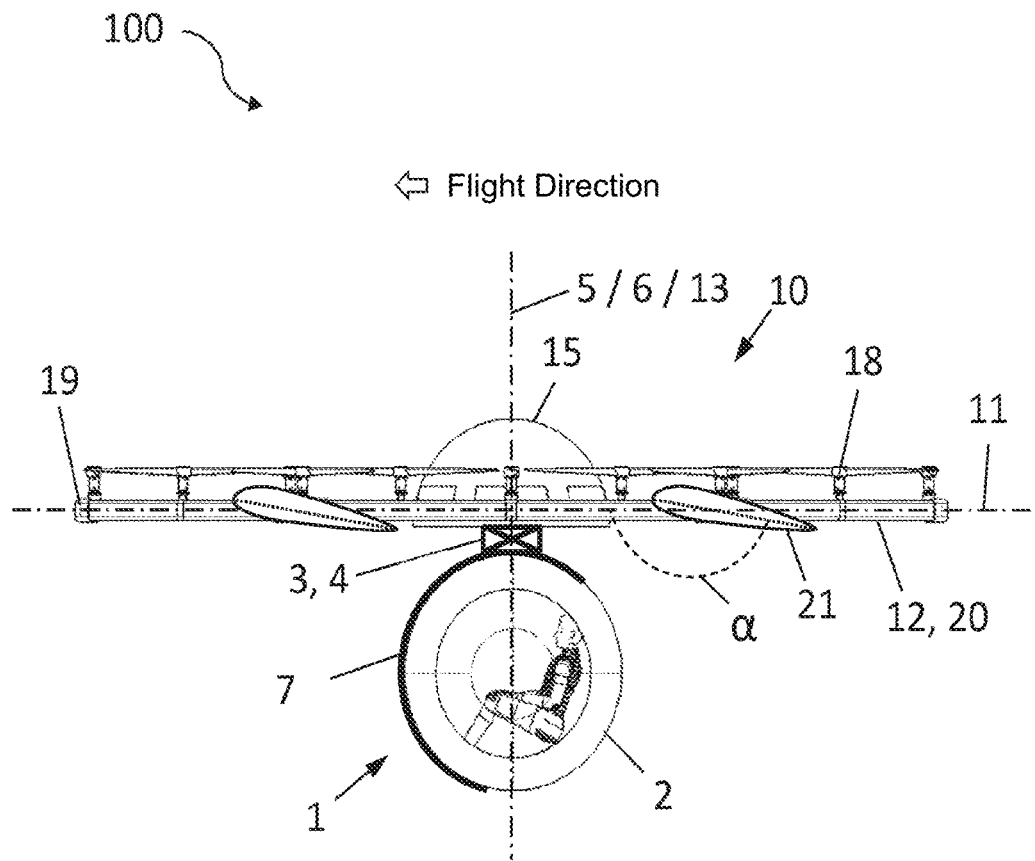
Figure 2:
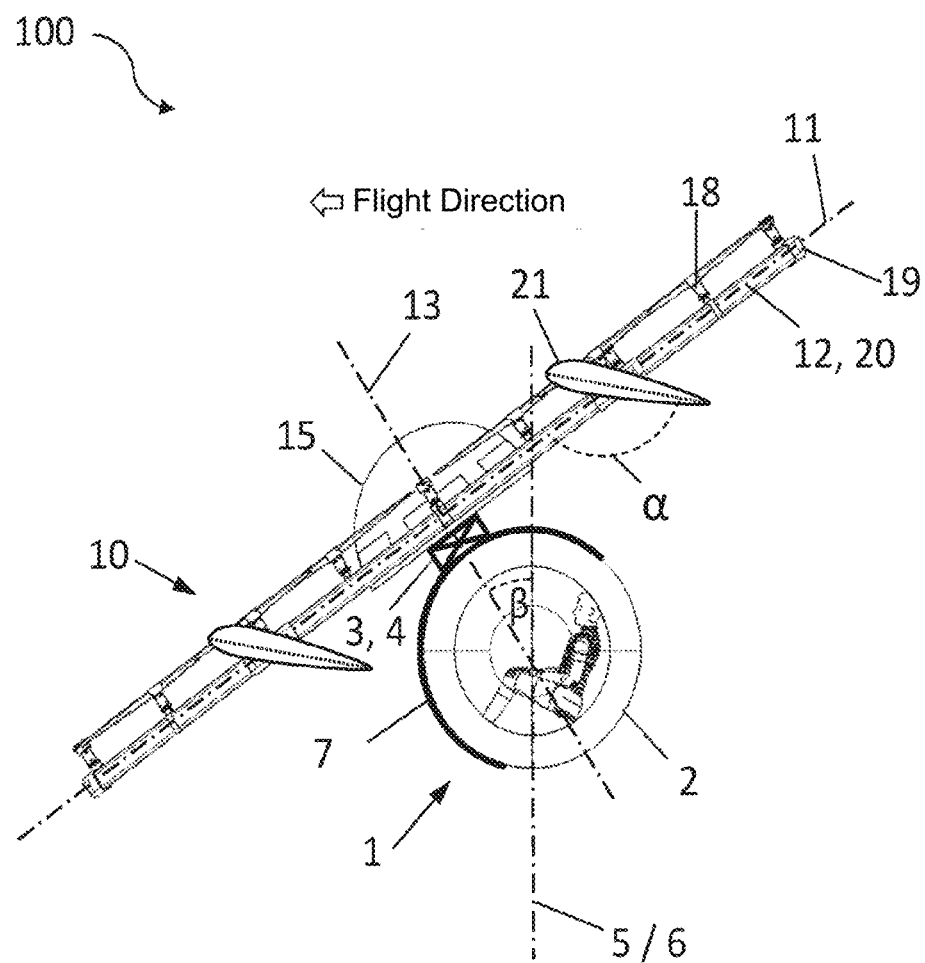
Figure 3:
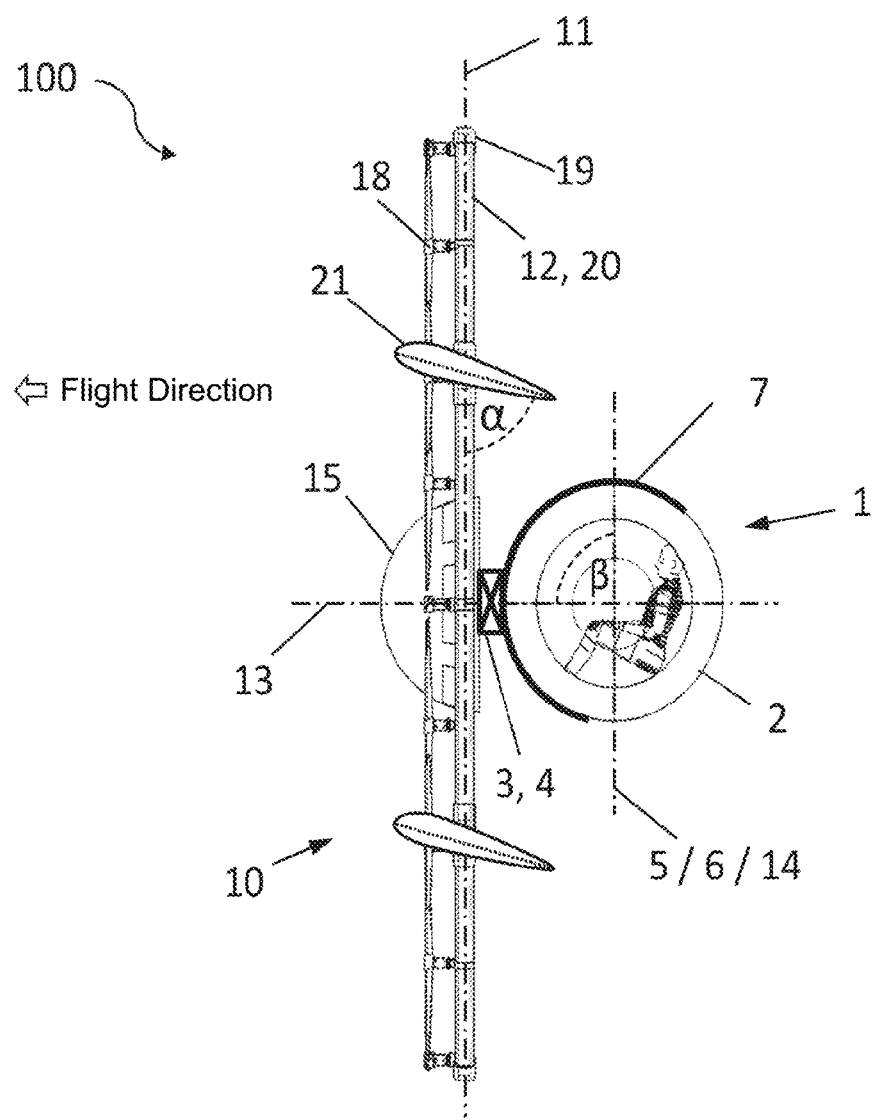
Figure 4:
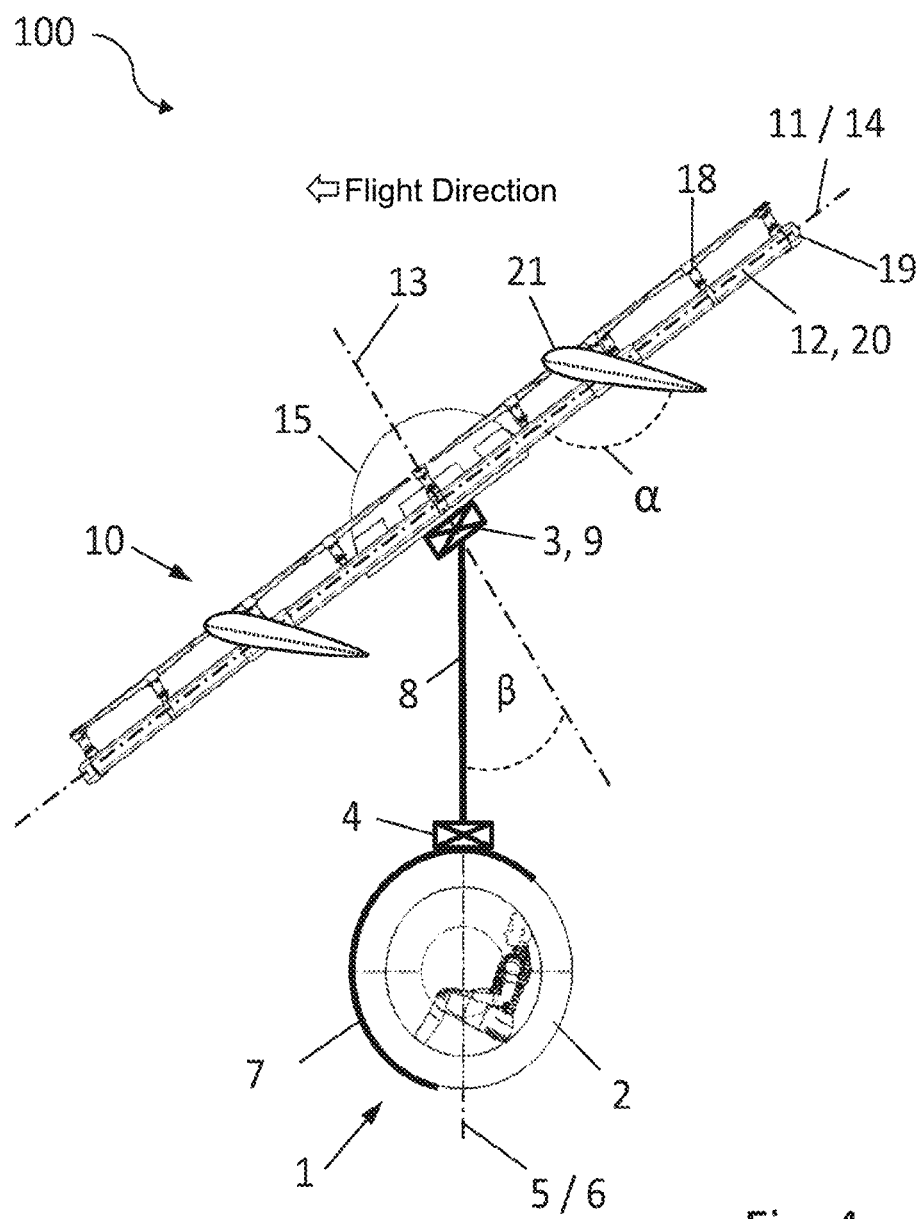
Figure 5:
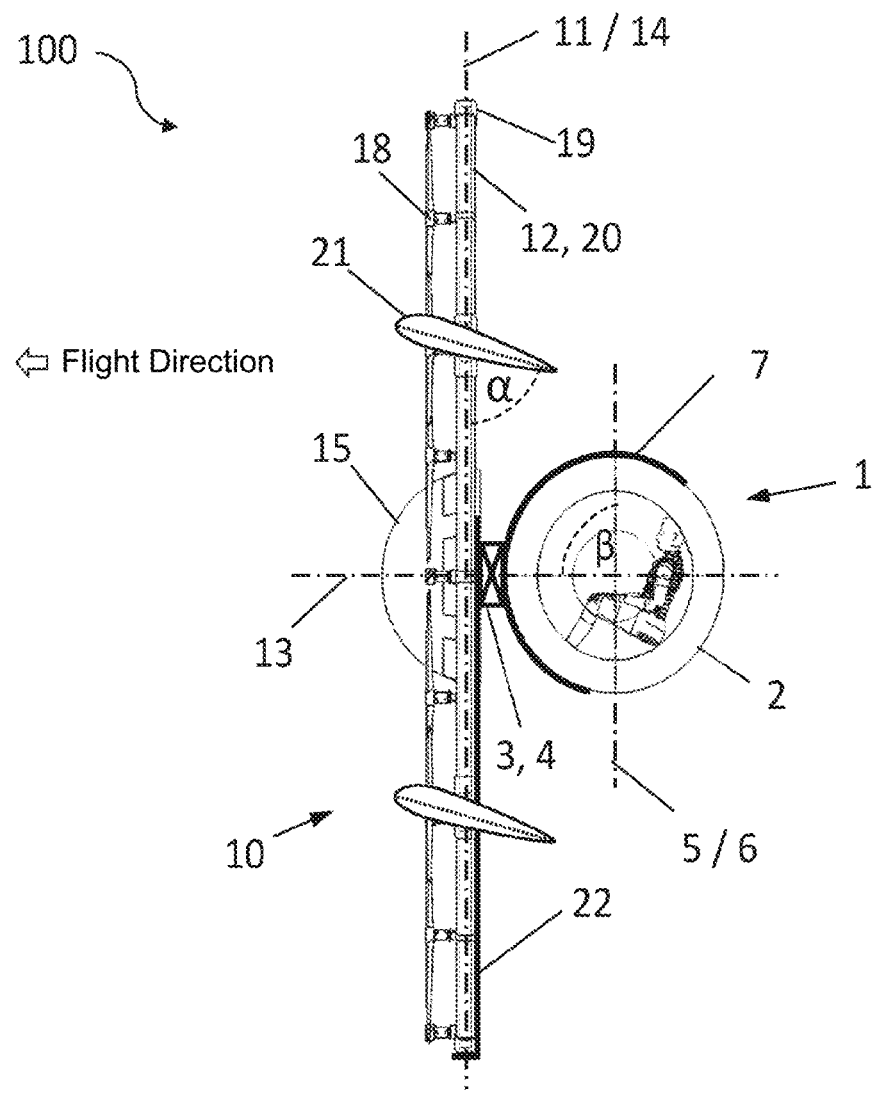
Figure 6:
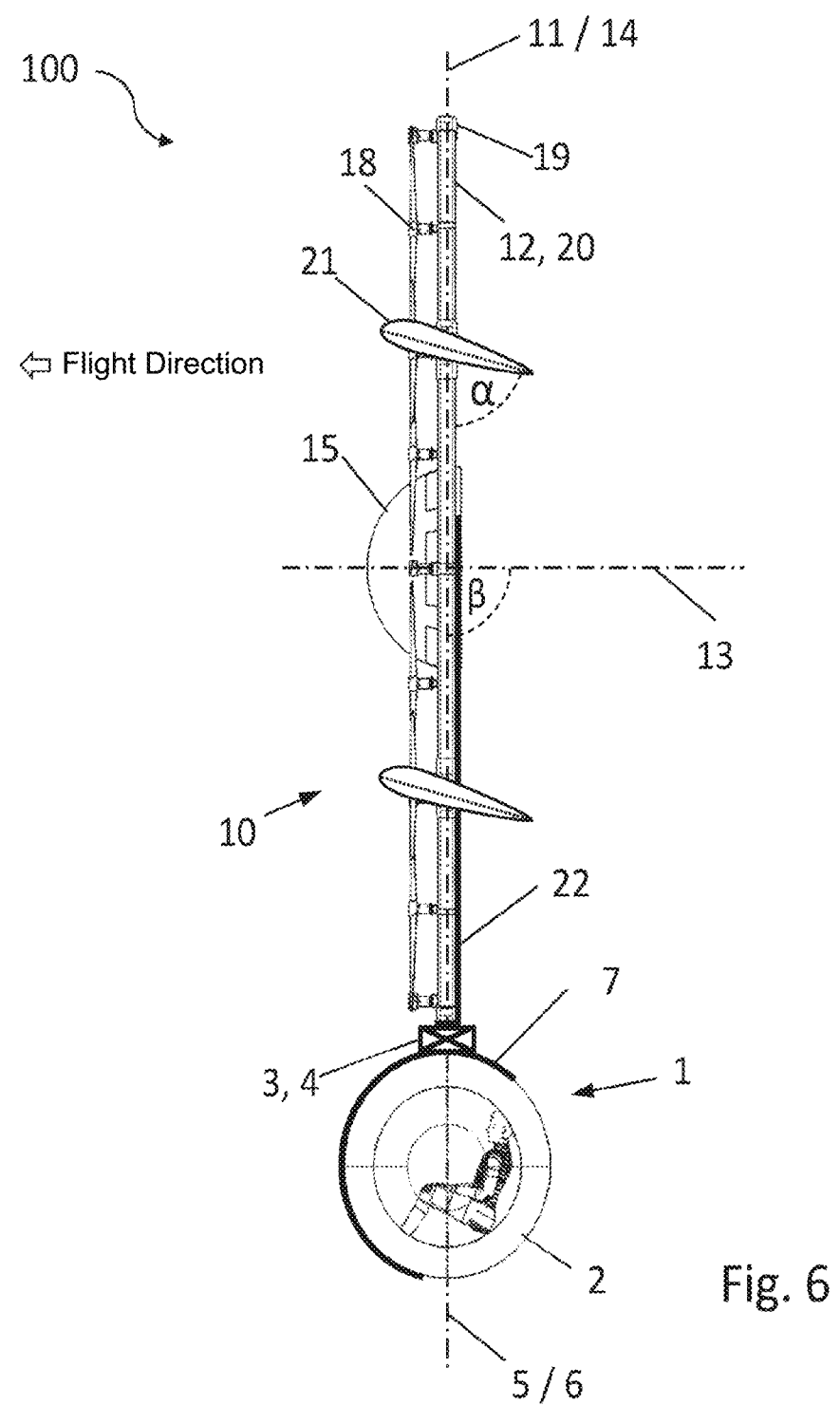
Figure 7:
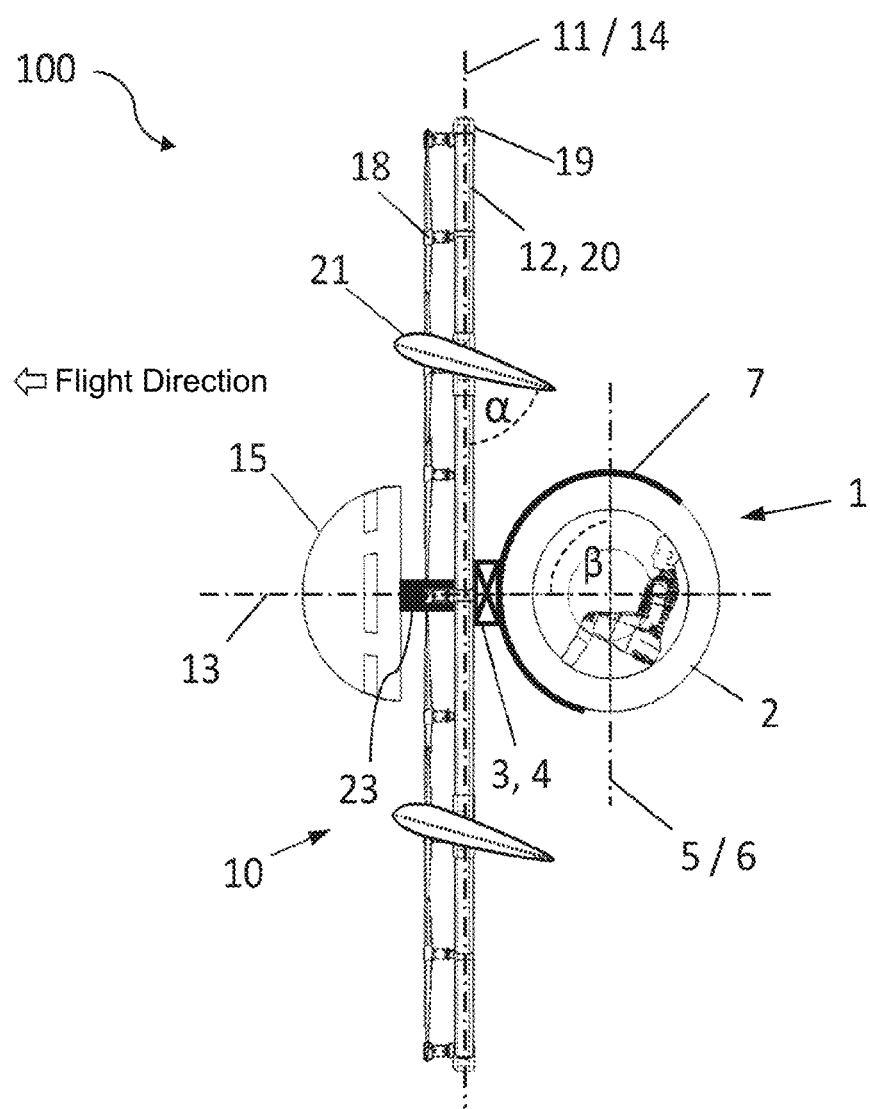
Figure 8:
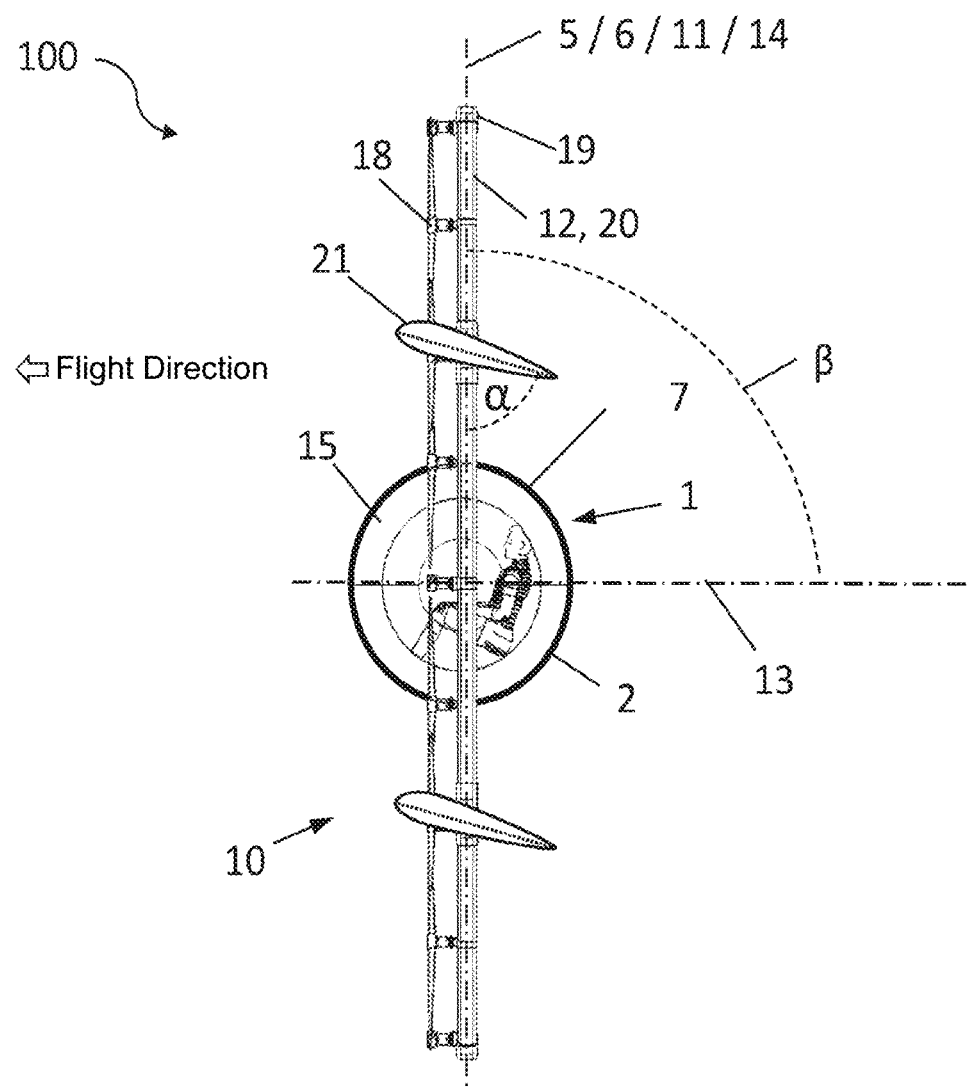
Figure 9:
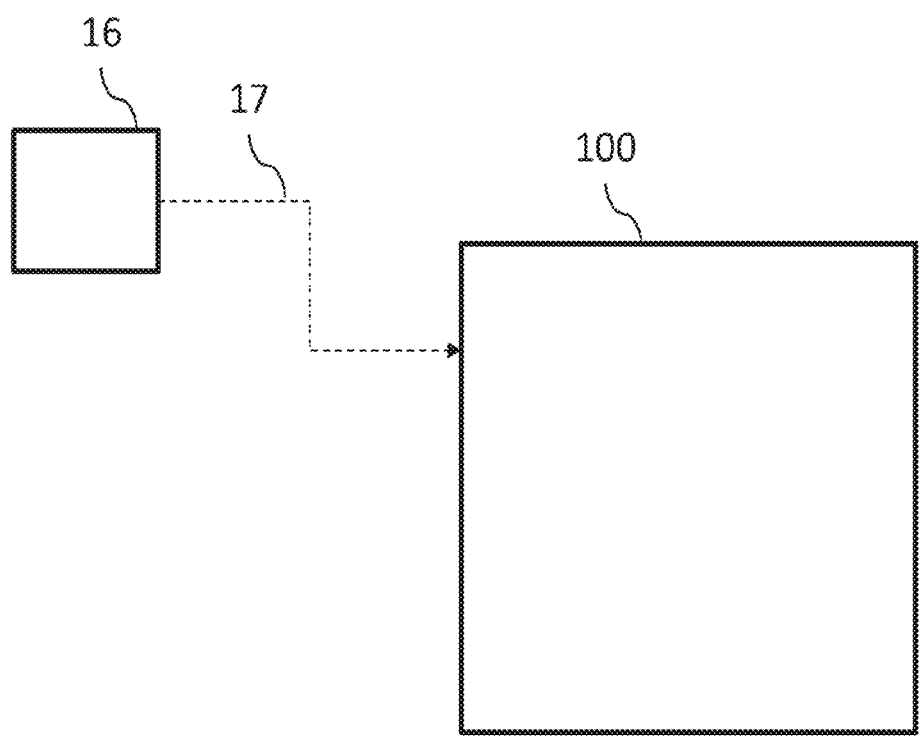

| | |
|---|---|
| FIG. 1 | schematic representation of a typical aircraft in side view with transport unit in a first inclined position; |
| FIG. 2 | schematic representation of a typical aircraft in FIG. 1 in a second inclined position; |
| FIG. 3 | schematic representation of a typical aircraft in FIG. 1 in a third inclined position; |
| FIG. 4 | schematic representation of another typical aircraft in side view with transport unit with longitudinally extended shaft in a second inclined position; |
| FIG. 5 | schematic representation of another typical aircraft in side view with sliding device in a third inclined position and a first sliding position; |
| FIG. 6 | schematic representation of the aircraft shown in FIG. 5 in the third inclined position and a second sliding position; |
| FIG. 7 | schematic representation of another typical aircraft with a central unit that can slide; |
| FIG. 8 | schematic representation of another typical aircraft with a transport facility arranged in the wing assembly plane of the flight unit; and |
| FIG. 9 | schematic representative of a typical control unit. |

In the examples explained below, reference is made to the accompanying drawings, which form part of the examples and in which specific embodiments in which the invention can be put into practice are shown for illustrative purposes. In this respect, directional terminology such as 'top', 'bottom', 'front', 'back', 'forward', 'rear' etc. is used with reference to the orientation of the described figures. Since components of embodiments can be positioned in a number of different orientations, the directional terminology is used for illustrative purposes and is in no way restrictive.

It is to be understood that other embodiments can be used and structural or logical changes made without departing from the protective scope of the present invention. It is further to be understood that the characteristics of the various embodiments described herein can be combined with each other unless specified to the contrary. The following detailed description is therefore not to be understood in a restrictive sense, and the protective scope of the present invention is defined by the appended claims. Identical or similar elements are assigned identical reference symbols in the drawings where appropriate.

DETAILED DESCRIPTION OF EMBODIMENTS OF THE INVENTION

FIGS. 1 to 3 show a first typical embodiment of a vertical take-off and landing aircraft 100 that can be used for transporting people and/or loads, in various inclined positions. Aircraft 100 shows a flight unit 10 and a transport unit 1 that is fastened to flight unit 10.

Flight unit 1 has a wing assembly 12 with several wing assembly struts 20 as well as a central unit 15. The wing assembly struts 20 are connected to one another a node points 19 by means of connecting pieces designed as T-pieces. The wing assembly struts 20 consist of a pultruded hollow profile made from fibre-reinforced plastic, e.g., carbon-fibre-reinforced plastic. Cables for signal connections and the power supply run through the hollow profile. Alternatively, other materials can also be used for the wing assembly struts 20.

The wing assembly 12 is formed by six wing assembly struts 20 extending radially outwards from the central unit 15 and by six further wing assembly struts 20 which join together, at node points 19, the ends of the radially extending wing assembly struts 20 opposite to the central unit 15, forming a hexagon and representing the outermost perimeter of wing assembly 12. Wing assembly 12 is designed in an extended manner in wing assembly plane 11 which means that wing assembly plane 11 corresponds to the central cross-section plane of wing assembly 12. It is rotationally symmetrical in relation to the surface normal 13 which is perpendicular in relation to wing assembly plane 11.

On wing assembly 12 there is a total of eighteen drive units 18 arranged concentrically around the central axis of flight unit 10, corresponding to the surface normals 13 marked out in FIGS. 1 to 3. Drive units 18 each have a propeller with a rotor comprising two rotor blades and a brushless DC motor as an electric motor with the propeller being driven by the electric motor. A hub on each propeller enables each propeller to be mounted on the electric motor with the ability to rotate. Of course, aircraft 100 can also be driven by a different number of drive units 18 or by a different design of drive units 18, e.g., each having more than two rotor blades.

Furthermore, four wing-shaped air deflectors 21 are arranged on the wing assembly 12 which have adjustable angles of approach α to enable the airflow conditions to be adjusted during the various flight phases of the aircraft 100, e.g., take-off, en-route flight phase, landing phase and to be able to vary features such as the lift conditions for the aircraft 100. However, the air deflectors 21 can also be eliminated.

The central unit 15 has a hemispherical housing made of carbon fibre-reinforced or glass fibre-reinforced plastic. Technical function units such as control, positioning and communication units and a charging module are arranged inside the housing. In addition, the central unit 15 has rechargeable batteries for supplying power to the drive units 18 and to other electrical consumers. For example, with reference to FIG. 9, shown below, control unit 16 can be arranged in the central unit.

As well as the flight unit 10, the aircraft 100 has a transport unit 1. The transport unit 1 has a transport facility 2, a fastening element 3 as well as a positioning unit 4, wherein, in the first typical embodiment, the fastening element 3 and the positioning unit form a single component.

The transport facility 2 has a transport capsule which is fundamental spherical in shape. Optionally, to reduce width, an ellipsoid can be used instead of this spherical shape. The transport capsule is completely enclosed and has a partially translucent outer surface to enable people to look out of the transport capsule.

Inside the transport capsule are seats equipped with seatbelts and airbags, an air-conditioning unit, displays and a communication facility for communicating with the central unit 15, with other aircraft or with a ground station.

Fastening element 3 serves to fasten transport unit 1 to flight unit 10. In a typical embodiment, fastening element 3 is designed as a screw connection. However, as an alternative, other detachable or non-detachable mountings, e.g., a welded connection, are possible. Fastening element 3 defines the fastening area in which the transport unit and flight unit are adjacent to one another when mounted to the transport unit.

The positioning unit 4 has a curved sliding unit 7 that encloses the transport capsule. The positioning unit 4 serves to change and secure an inclined position on the transport facility 2 in relation to fastening element 3 and/or the fastening area defined by fastening element 3. In other words, the tilt of the transport facility 2 in relation to the fastening element 3 and therefore in relation to flight unit 1 can be varied.

The inclined position is established by the angle of inclination ($\beta$, i.e., by the smaller of the two angles formed by the central axis 5 of the transport facility 1 and the surface normal 13 of the wing assembly plane 11. Here, the central axis 5 corresponds to a gravitational field line 6 of the gravitational field of Earth. In the first inclined position shown in FIG. 1, the angle of inclination $\beta=0°$, i.e., the central axis 5, the gravitational field line 6 and the surface normal 13 are all equivalent to one another. In the typical embodiment, the angle of inclination $\beta$ can vary between 0° and 90°.

To alter the angle of inclination, the transport facility 1 is moved with the curved sliding fixture 7 in positioning unit 4. For this, a gear connection is used. A securing pin is used to secure the unit in the desired inclined position.

In the second inclined position shown in FIG. 2 the angle of inclination is approx. 35°, in the third inclined position shown in FIG. 3 it is 90°, i.e., the central axis 5 corresponds to a parallel line 14 of the wing assembly plane or is aligned parallel to the wing assembly plane 11.

The angle of inclination $\beta$ can be varied in particular as a function of an inclination of the wing assembly plane 11 with respect to a gravitational field line 6 of the gravitational field of Earth, for example as a function of different flight phases of the aircraft 100. Accordingly, it is always possible to vary the angle of inclination $\beta$ in such a way that the central axis 5 runs along the gravitational field line 6. This ensures constant positioning of the transport facility 1 in the gravitational field, meaning that no change occurs in the position of the people and/or loads being transported in relation to the surface of the Earth.

Accordingly, an angle of inclination $\beta=0°$ can be selected during a take-off or landing phase of the aircraft 100, in which the aircraft 100 is oriented as shown in FIG. 1, i.e., with a wing assembly plane 11 oriented essentially parallel to the surface of the Earth or perpendicular to the gravitational field line 6. In contrast, the angle of inclination $\beta$ can be $\beta=90°$ in an en-route flight phase of the aircraft 100, in which the aircraft 100 is oriented as shown in FIG. 3, i.e., with a wing assembly plane 11 oriented essentially perpendicular to the surface of the Earth or parallel to the gravitational field line 6. FIG. 2 shows the aircraft 100 during the transition from the take-off phase to the en-route flight phase and during the transition from the en-route flight phase to the landing phase. Tilt angle $\beta$ is between 0° and 90° and equates to approx. $\beta\sim35°$. FIGS. 1 to 3 also show that the angle of approach $\alpha$ varies depending on the flight phase.

FIG. 4 illustrates a second typical embodiment of an aircraft 100 in transition from the take-off phase to the en-route flight phase or in transition from the en-route flight phase to the landing phase, i.e., in a second inclined position with an angle of inclination $\beta\sim35°$. The aircraft 100 of this typical embodiment differs from the aircraft 100 of the first typical embodiment (see FIGS. 1 to 3) in that the transport unit 1 has a longitudinally extended shaft 8 which connects at one end to the fastening element 3 and at the other end to the positioning unit 4.

The shaft 8 is used for the spaced arrangement of the transport facility 2 with respect to the flight unit 10 so that a safety clearance can be maintained. Primarily, the shaft 8 is rotationally symmetrical.

Furthermore, fastening element 3 is arranged as part of a coupling device 9 which means that the transport unit 1 is detachably mounted to the flight unit. The coupling device 9 is designed as an articulated coupling device in the typical embodiment. In combination with a modular layout of the aircraft 100, coupling device 9 facilitates a flexible combination of different flight units 10 with various transport units 1.

FIGS. 5 and 6 illustrate a third typical embodiment of an aircraft 100 on an extended flight, i.e., at an angle of inclination of $\beta=90°$. Aircraft 100 of this typical embodiment distinguishes itself relative to aircraft 100 of the first typical embodiment (see FIGS. 1 to 3) by having the flight unit 10 arranged in a linear sliding unit 22.

Using the linear sliding unit 22, the fastening element 3 is able to slide along the wing assembly 12 parallel to the wing assembly plane 11 between a centric position (see FIG. 5) and an outer position (see FIG. 6). A centric position can be understood to mean a position within the area of the central axis of the flight unit 10.

An outer position can be understood to mean any off-center position on the wing assembly 12 outside the area of the central axis, for example a position on a radial outer end of the wing assembly 12, i.e., an end of the wing assembly 12 as far as possible from the central axis, and/or an external limit point on the wing assembly 12.

By way of example, the articulated coupling device can slide along a wing assembly strut, along two opposing wing assembly struts or also along all wing assembly struts. In this way, the displacement can also be used to react to prevailing wind conditions and, for example, to compensate for a tilt of the transport capsule due to crosswind and/or to enable a better load distribution.

By way of example, a linear drive unit can be used to relocate the fastening element 3. The linear drive unit can, for example, comprise a rail system arranged on the wing assembly 12, in or on which a carriage is movably mounted, e.g., using a ball bearing, which supports the fastening element 3.

The linear sliding unit 22 can be driven, for example, by means of a driven spindle formed by a rotatable toothed rack or by a threaded rod, or by means of a rotationally driven toothed belt, whereby these transmission elements can be powered electrically, e.g., by a servomotor 20. Alternatively, the drive of the linear sliding unit 22 can also be magnetic or electromagnetic.

Advantageously, a linear drive unit of this kind can possess powerful acceleration, retardation and rapid change-over of operating mode which enables it to reverse its direction of travel quickly.

In the centric position shown in FIG. 5 the transport unit 1 in part receives airflow from the propeller backwash from the drive units 18 and this can give rise to turbulence problems and unfavourable airflow conditions as well as increased air resistance. However, if instead the transport unit is in an outer position, as shown in FIG. 6, this case does not apply because the transport unit 1 is exposed to oncoming airflow freely and this does not affect the backwash from the propellers.

Furthermore, when transport unit 1 is arranged in a centric position, the centre of gravity of the aircraft 100 is located in the same central point. In the event of disturbance factors such as turbulence, air holes, etc., the tilting of the aircraft 100 must be corrected by torques/rotational impulses around the central axis of the flight unit or the centre of gravity axis by the thrust of the propellers.

If on the other hand the transport unit 1 is arranged in an outer position, a large mass (transport unit 1 and payload) is suspended below the flight unit 10. This also shifts the centre of gravity of the aircraft 100 downwards. This can have a positive effect in the event of disturbances that cause an angular momentum, as the aircraft 100 swings back into a stable position via the propellers of the drive units 18 even without active intervention, or when active control is positively supported.

FIG. 7 illustrates a fourth typical embodiment of an aircraft 100 in in en-route flight phase, i.e., at an angle of inclination β=90°. The aircraft 100 of this typical embodiment distinguishes itself relative to aircraft 100 of the first typical embodiment (see FIGS. 1 to 3) by having the ability to slide the central unit 15 along the surface normal 13 of the wing assembly plane 11 using the sliding device 23. This sliding movement can be performed in relation to an inclined position of the flight unit 10, i.e., dependent upon whether the aircraft 100 is in a take-off or landing phase or is instead in an en-route flight phase.

FIG. 7 shows the central unit in a further out position. By way of comparison, the central unit 15 in FIG. 3 is arranged closer to the wing assembly plane 11. The further out position shown in FIG. 7 makes it possible to relocate the centre of gravity of aircraft 100. Here, the central unit 15 acts as a counterweight to the transport unit 11.

FIG. 8 illustrates a fifth typical embodiment of an aircraft 100 on an en-route flight, i.e., at an angle of inclination of β=90°. Aircraft 100 of this typical embodiment distinguishes itself relative to aircraft 100 of the first typical embodiment (see FIGS. 1 to 3) by having transport facility 2 arranged in wing assembly plane 11 of flight unit 10. In the typical embodiment, the transport facility 2 is arranged centrally in relation to the wing assembly plane 11 so that it extends to both sides of the wing assembly plane 11. As a consequence of this, the centre of gravity of the aircraft 100 is located in the wing assembly plane 11.

FIG. 9 illustrates a control unit 16 for controlling aircraft 100. For example, as described above, aircraft 100 can be designed with reference to FIGS. 1 to 8. The control unit 16 is set up and designed to generate and issue control signals 17 to the aircraft 100. The control signals 17 cause a change in the inclined position of the transport facility 2 in regard to the fastening element 3. Optionally, the control signals 17 can also cause a change in the sliding position of the central unit as a function of an inclined position of flight unit 10.

Control unit 16 can be arranged in aircraft 100, e.g., in its central unit 15. Alternatively, the control unit 16 can be arranged outside the aircraft 100. In this case, the transmission of the control signals 17 can, for example, be carried out by means of wireless transmission, in that the control unit 16 is equipped with a transmitter device for radio signals and the aircraft 100 is equipped with a receiver device for radio signals.

LIST OF REFERENCE SIGNS

1 Transport unit
2 Transport facility
3 Fastening element
4 Positioning unit
5 Central axis of transport facility
6 Gravitational field line
7 Curved sliding unit
8 Shaft
9 Coupling device
10 Flight unit
11 Wing assembly plane
12 Wing assembly
13 Surface normal
14 Parallel
15 Central unit
16 Control unit
17 Control signal
18 Drive unit
19 Node point
20 Wing assembly strut
21 Wing-shaped air deflector
22 Linear sliding unit
23 Sliding device
100 Aircraft
α Angle of attack
β Angle of inclination

What is claimed is:

1. A transport unit for a vertical take-off and landing aircraft for transporting people and/or loads, wherein the transport unit comprises:
   a transport facility,
   at least one fastening element which is configured for fastening the transport unit to a flight unit of the aircraft, and
   a positioning device which is configured for changing and fixing an inclined position of the transport facility relative to the at least one fastening element and comprises a curved sliding device.

2. The transport unit of claim 1, wherein the inclined position of the transport facility can be changed and fixed in such a way that a central axis of the transport facility always runs along a gravitational field line of a gravitational field acting on the transport unit.

3. The transport unit of claim 1, wherein the curved sliding device is a rotary rail.

4. The transport unit of claim 1, wherein the transport unit further comprises a longitudinally extended shaft, one end of which connects to the fastening element and the other end of which connects to the positioning device.

5. The transport unit of claim 1, wherein the at least one fastening element forms part of a coupling device which is configured for releasably mounting the transport unit on the flight unit.

6. A vertical take-off and landing aircraft for transporting people and/or loads, wherein the aircraft comprises:
   a flight unit and
   a transport unit of claim 1 mounted on the flight unit.

7. The aircraft of claim 6, wherein the flight unit comprises a framework structure which extends across at least one framework structure plane, and wherein for changing the inclined position of the transport facility relative to the fastening element a central axis of the transport facility can be positioned by the positioning device in a region that extends between a plane normal of the framework structure plane and a parallel of the framework structure plane.

8. The aircraft of claim 7, wherein the transport facility is arranged in the at least one framework structure plane.

9. The aircraft of claim 7, wherein the fastening element is slidable along the framework structure.

10. The aircraft of claim 6, wherein the aircraft further comprises a central unit.

11. The aircraft of claim 10, wherein the central unit can be shifted along a central axis of the transport facility or along a surface normal of the at least one framework structure plane.

12. The aircraft of claim 11, wherein the central unit is integrated in the transport facility.

13. A vertical take-off and landing aircraft for transporting people and/or loads, wherein the aircraft comprises:
   a flight unit which comprises a framework structure that extends in at least one framework structure plane, and
   a transport unit of claim 1 attached to the flight unit and comprising a transport facility which is arranged in the at least one framework structure plane.

14. The aircraft of claim 13, wherein the aircraft further comprises a central unit.

15. The aircraft of claim 14, wherein the central unit can be shifted along a central axis of the transport facility or along a surface normal of the at least one framework structure plane.

16. The aircraft of claim 14, wherein the central unit is integrated in the transport facility.

17. A vertical take-off and landing aircraft for transporting people and/or loads, wherein the aircraft comprises:
   a flight unit comprising a framework structure extending in at least one framework structure plane,
   a transport unit secured to the flight unit comprising a transport facility and
   a central unit,
   the central unit being slidable along a surface normal of the at least one framework structure plane.

18. A control unit for controlling the aircraft of claim 6, wherein the control unit is set up and configured to generate and issue control signals that cause a change in the inclined position of the transport facility relative to the at least one fastening element and/or a change in a sliding position of the central unit as a function of an inclined position of the flight unit.

19. A control unit for controlling the aircraft of claim 13, wherein the control unit is set up and configured to generate and issue control signals that cause a change in the inclined position of the transport facility relative to the at least one fastening element and/or a change in a sliding position of the central unit as a function of an inclined position of the flight unit.

20. A control unit for controlling the aircraft of claim 14, wherein the control unit is set up and configured to generate and issue control signals that cause a change in the inclined position of the transport facility relative to at least one fastening element which is configured for fastening the transport unit to a flight unit of the aircraft and/or a change in a sliding position of the central unit as a function of an inclined position of the flight unit.

* * * * *